United States Patent [19]
Milani

[11] Patent Number: 4,530,650
[45] Date of Patent: Jul. 23, 1985

[54] APPARATUS FOR SIZING EXTRUDED PLASTICS SECTIONS
[75] Inventor: Francesco Milani, Lonate Pozzolo, Italy
[73] Assignee: Milani Resine S.p.A., Italy
[21] Appl. No.: 629,082
[22] Filed: Jul. 9, 1984
[30] Foreign Application Priority Data Jul. 26, 1983 [IT] Italy .................. 22229 A/83

[51] Int. Cl.³ ............................................. B29C 17/00
[52] U.S. Cl. ...................................... 425/71; 425/325
[58] Field of Search .................. 425/71, 383, 384, 325
[56] References Cited

U.S. PATENT DOCUMENTS 3,538,210 11/1970 Gatto ................................. 425/71 X
3,821,349 6/1974 Mozer ............................... 425/71 X
3,989,779 11/1976 Brunnhofer ....................... 425/71 X
4,029,452 6/1977 Schippers et al. ............... 425/325 X
4,154,563 5/1979 Johnson ........................... 425/325 X

OTHER PUBLICATIONS

T900,024 7/72 Hollander.

Primary Examiner—J. Howard Flint, Jr.
Attorney, Agent, or Firm—Diller, Raik & Wight

[57] ABSTRACT

An apparatus for sizing extruded plastics sections is proposed in which, in order to increase the heat transfer capacity between the hot plastics mass of the section and a cooling vehicle in a reduced space and to allow high production rates, there is interposed between metal block-type sizing gauges a cooling tank to be traversed by the section to be cooled between one sizing gauge portion and a subsequent sizing gauge portion. In this tank, which can also be placed under vacuum, the section is subjected to the action of a cooling fluid such as water or air which acts directly on its outer walls.

9 Claims, 3 Drawing Figures

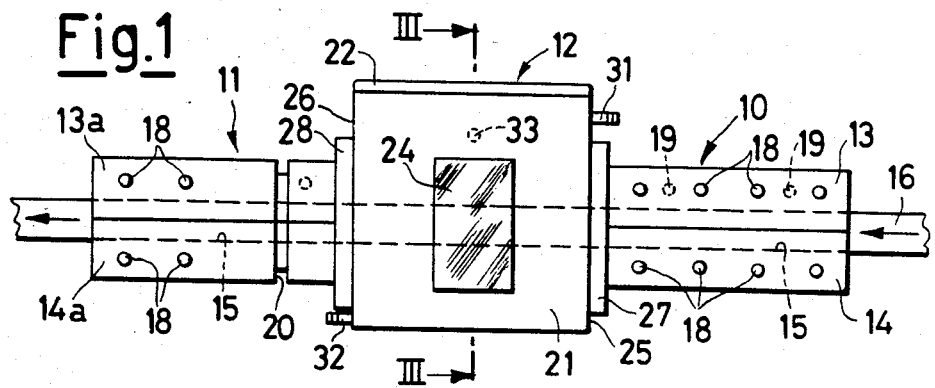
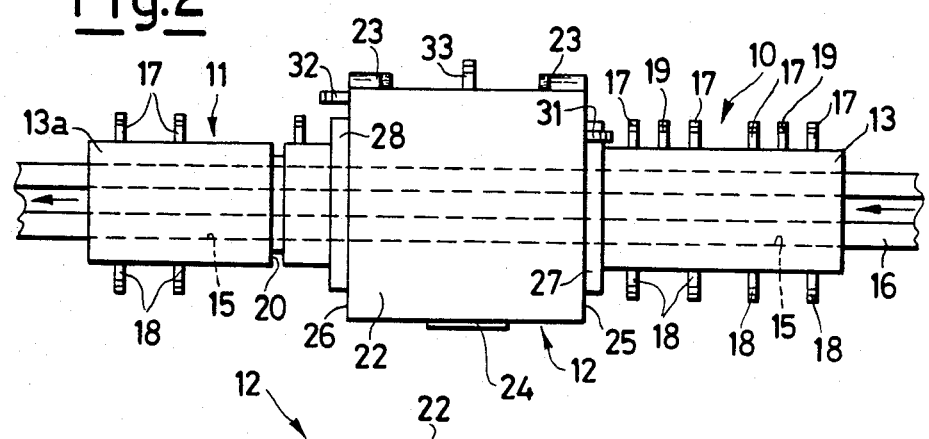
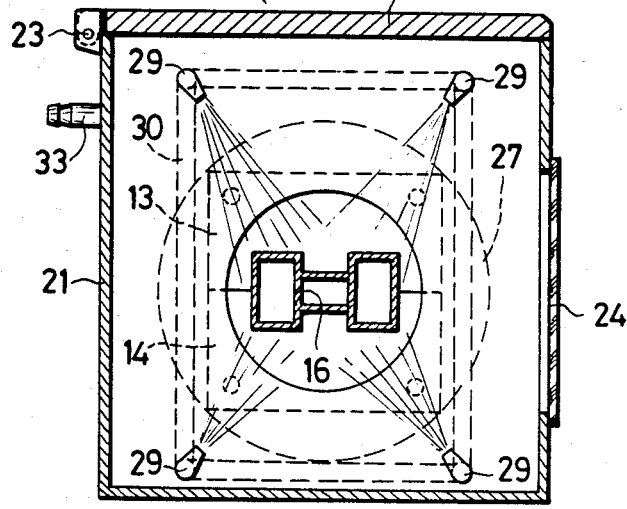

APPARATUS FOR SIZING EXTRUDED PLASTICS SECTIONS

This invention relates to an apparatus for sizing extruded plastics sections.

In the production of rigid plastics sections, which can be solid or hollow and be of simple or more or less complex shape, including mixed solid and hollow, sizing gauges are used in order to cool the plastics mass of the just extruded section by thermal convection and to give it the required final shape which is to be preserved when in its cooled state.

Such sizing gauges are normally in the form of a metal or light alloy block, in which a first series of ducts is provided for the circulation of a cooling vehicle, normally water. In this metal block, which is generally constructed in two halves suitably joined together, the longitudinal cavity through which the section to be cooled passes has a cross-section corresponding to the section shape, and in order to ensure that the section adheres to the walls of said longitudinal inner cavity during its traversing, the metal block forming the sizing gauge is provided with a second series of ducts connected to bores or cut slots which open at the walls of the inner cavity in the block and are located in suitable positions and at suitable distances apart, this second series of ducts, bores and/or slots being connected to a vacuum source so that the section traversing the inner cavity of the metal block is drawn against the walls of said cavity.

In this sizing system, the section production rate depends on the heat transfer capacity produced by the sliding of the plastics section against the cooled walls of the metal block. A production increase, for example, is not possible when the heat transfer capacity is such as not to allow sufficient cooling of the plastics section.

Insufficient cooling of the section in the sizing gauge would in practice result in considerable stretching of the section, thus making its production impossible. For this reason it has been found that known sizing systems place a limit on the production rate which cannot be overcome.

The object of the present invention is therefore to provide an apparatus for sizing extruded plastics sections which enables the heat transfer capacity to be increased within a reduced space relative to conventional sizing gauges, and which allows a considerably increased production rate for equal apparatus lenghts.

This object is attained according to the invention by an apparatus for sizing extruded plastics sections which is characterised by comprising at least two sizing gauge portions in the form of a metal block with a through cavity under vacuum, namely an inlet portion and an outlet portion, and a tank inserted between these sizing gauge portions in order to be freely transversed by the section as it passes from the inlet sizing gauge portion to the outlet sizing gauge portion, means being provided in said tank for subjecting the traversing section to the action of a cooling fluid.

The cooling fluid acting in said tank can be circulating air, but water is preferably used. If water is used as the cooling vehicle, the water can form in the tank a bath into which the section is immersed in direct contact with the water as it traverses the tank, but the water can also be used in the form of sprays directed against the section traversing the tank. These water sprays advantageously strike several sides of the section leaving the first sizing gauge portion to enter the tank.

Particularly in the case of sizing and cooling tubular sections it is advantageous to put the tank under vacuum for the main purpose of preventing the walls of the section becoming flabby and to maintain the shape of this latter as it traverses the tank.

The application of vacuum to the tank does not prevent the simultaneous action of the cooling water in the tank, whether in the form of a bath or in the form of sprays. The tank interposed between the two sizing gauge portions can be used universally for any type of section, and is advantageously formed from a metal box, possibly provided with a cover which can be closed in a sealed manner, to two opposing walls thereof there being fixed, preferably by flanges, the two sizing gauge portions, the inner cavities of which freely open into the inner space of the box by way of apertures which are provided in the opposing walls of the box and in the fixing flanges and have an area greater than that of the sizing gauge cavities. This box is provided with suitable connectors for feeding and discharging the cooling fluid and for the possible application of vacuum to its interior.

It should be noted that the sizing apparatus according to the invention can also comprise more than one cooling tank, in which case each tank is inserted between an upstream sizing gauge portion and a downstream sizing gauge portion.

Practical tests carried out with the sizing apparatus according to the invention have shown that by using a unit formed from two sizing gauge portions with a cooling tank interposed, a cooling capacity increase is obtained to such an extent that considering such a unit and a normal sizing gauge which are of equal lengths, it is possible to double the production rate relative to that obtainable using the conventional sizing gauge.

This result is due to the presence of said tank, in which the cooling vehicle is able to act directly on the section, leading to high heat transfer.

The apparatus is completed by suitable members for controlling the cooling fluid flow in the sizing gauge portions and tank, and for controlling the vacuum to be applied to the sizing gauge portions or possibly to the tank, and by suitable measuring instruments.

One embodiment of the sizing apparatus according to the invention is described in detail hereinafter with reference to the accompanying diagrammatic drawings, in which FIG. 1 is a side view of the apparatus, FIG. 2 is a plan view, and FIG. 3 is a cross-section through the tank on the line III—III of FIG. 1.

The apparatus shown on the drawings comprises substantially an inlet sizing gauge portion indicated overall by 10, an outlet sizing gauge portion indicated overall by 11, and a tank 12 interposed between the two sizing gauge portions 10 and 11.

It should be noted that the sizing gauge portions can be formed in accordance with the conventional art, and have no new or special intrinsic characteristics. Consequently these sizing gauge portions are shown only diagrammatically on the drawings and are described only briefly, without going into detail.

Each sizing gauge portion is constituted by a metal block in two halves, such as the halves 13, 14 for the sizing gauge portion 10 and the halves 13a and 14a for the sizing gauge portion 11, the two halves being joined together in a sealed manner in order to define an internal longitudinal through cavity 15 having a profile identical to that of the section 16 to be sized and cooled, this section originating from an extruder die (not shown). The half blocks 13, 14 and 13a, 14a are provided with suitable connectors such as 17, 18, respectively for the inlet and outlet of cooling water circulating through suitable internal ducts provided in said half blocks, and connectors such as 19 for connection to a source of vacuum, the latter connectors 19 being in communication with channels and bores or cut slots provided in the half blocks and opening at the walls of the cavity 15 in order to cause the section to adhere to the walls of the cavity 15 by vacuum as it traverses this latter.

The operation of the two sizing gauge portions 10 and 11 described heretofore is conventional and does not require further explanation.It need merely be mentioned that the outlet sizing gauge portion 11, instead of being cooled, can advantageously be slightly heated by water made to circulate through its inner ducts, in order to prevent excessive cooling of the section passing through its inner cavity 15, which could cause the section to separate from the walls of the inner cavity 15 and prevent its perfect adhesion by means of the vacuum.

In order to prevent heat transfer between the outlet sizing gauge portion 11 and the tank 12 (which is kept at a lower temperature than the outlet sizing gauge portion), the block forming the sizing gauge portion 11 is provided with a circumferential recess 20 which reduces the metal mass of the block in this zone, so also reducing the facility for heat transfer.

As stated, the main and characteristic part of the sizing apparatus according to the invention is the tank 12 inserted between the two sizing gauge portions 10 and 11.

The tank 12 is formed from a metal box 21 provided with a lid 22 hinged at 23 in order to close said box in a sealed manner. The front wall of the box 21 can be provided with an inspection window 24.

The outlet end of the sizing gauge portion 10 and the inlet end of the sizing gauge portion 11 are fixed respectively to the two opposing side walls 25 and 26 of the box 21 by way of flanges 27, 28, as clearly shown in FIGS. 1 and 2.

It should be noted that both the flanges 27 and 28 and the side walls 25 and 26 of the box 21 are provided with through holes having an area greater than that of the inner cavities 15 of the sizing gauge portions 10 and 11, so that the cavities 15 open freely into the interior of the box 21 to allow free passage of the section 16 from the cavity of the sizing gauge portion 10, through the interior of the box 21, and into the cavity of the sizing gauge portion 11. The box can thus be used for any shape or type of section and does not need to be adapted to the section. In the interior of the box 21 the section 16 is completely free, i.e. is not surrounded by walls along which it has to adheringly slide, as when passing through the sizing gauge portions. Consequently the outer walls of the section 16 can be subjected to direct cooling by a suitable fluid, preferably air or water.

In the case shown by way of example, cooling is provided in the tank 12, i.e. in the interior of the box 21, by water sprays directed against the traversing section 16.

For this purpose, spray nozzles 29 are disposed in the vicinity of the four corners at the wall 25 of the box 21 where the section 16 enters (see FIG. 3), and, by means of suitable channels 30, which can be formed in the wall 25, they are connected together and to a connector 31, which can be connected to a water supply. A discharge connector 32 is provided at the opposite wall 26 of the box 21. The section 16 is thus struck directly by the water sprays leaving the nozzles 29, and is thus effectively cooled under high heat transfer.

It should be noted that the section 16 leaving the inlet sizing gauge portion 10 and entering the tank 12 is generally already solidified to a point at which it becomes self-supporting. This is particularly true for flat-walled sections. However, especially in the case of tubular sections such as the section 16 illustrated, the section walls, which are no longer pulled by vacuum against the walls of the inner cavity of the sizing gauge portion 10, could become flabby during passage through the tank 12 and cause the section to lose its shape. In order to prevent this, vacuum can also be applied to the interior of the box 21, and for this purpose the box 21 is provided at its top with a connector 33 for connection to a source of vacuum. The vacuum is maintained in the box 21 by virtue of the lid 22 which closes it in a sealed manner.

It has already been stated that cooling in the tank 12 could also be implemented by a water bath which fills the box 21 to a certain level determined by an overflow, so that the passing section remains immersed in the water bath. In this case, said bath could be either stationary and be simply fed at a low rate in order to make-up the water loss, or there could be a continuous circulation of water such as to maintain a certain constant level inside the tank 12. If operating with a water bath, it is also possible to apply the vacuum above the water level, the vacuum having the same function as heretofore stated.

Finally, it would also be possible to create a circulation of cooling air inside the box 21.

The apparatus described heretofore and illustrated on the drawings could also be used in certain cases in repetitive form, or more than two sizing gauge portions could be used, with a cooling tank interposed between each successive pair.

With the sizing apparatus according to the present invention, a considerable increase in heat transfer capacity over conventional sizing gauges is obtained, and within a smaller space, so that for equal apparatus lengths it is possible to considerably increase the production rate, up to double.

By way of example, the two sizing gauge portions upstream and downstream of the tank can each have a length approximately equal to one third of that of a normal sizing gauge (which for conventional vacuum sizing gauges varies from 80 to 120 cm).

The total length of the apparatus composed of two sizing gauge portions and a tank disposed therebetween is thus approximately equal to that of a single conventional sizing gauge, whereas the cooling capacity of the apparatus according to the invention is such as to allow a production rate double that of a normal sizing gauge.

I claim:

1. An apparatus for sizing an extruded plastic section comprising inlet and outlet sizing gauge portions each in the form of a metal block having a cavity therethrough, means for placing each cavity under vacuum whereby an extruded plastic section passing through each cavity is sized to the configuration thereof, a tank positioned between said inlet and outlet sizing gauge portions which is freely transversed by the extruded plastic section as it passes from the inlet sizing gauge portion to the outlet sizing gauge portion, said tank having two opposite inlet and outlet side walls having respective inlet and outlet openings therein, means for securing said inlet and outlet sizing gauge portions to said respective inlet and outlet side walls, said inlet and outlet openings having a greater transverse area than the transverse area of said inlet and outlet cavities, respectively, whereby an extruded plastic section passes unobstructedly through said inlet and outlet openings, means in said tank for subjecting the extruded plastic section to a cooling fluid, and said cooling fluid subjecting means includes spray nozzles disposed at corners of said tank inlet side wall directed toward the extruded plastic section.

2. The apparatus as defined in claim 1 wherein said inlet and outlet sizing gauge securing means includes a flange of each gauge secured to its associated side wall.

3. The apparatus as defined in claim 1 wherein said tank includes an upper portion closed by a lid.

4. The apparatus as defined in claim 1 wherein said tank includes a front wall provided with an inspection window.

5. The apparatus as defined in claim 1 including means in said tank at a level appreciably above a path defined by the extruded plastic section as it passes through said tank for effecting an overflow of the cooling fluid such as to create a water bath in the tank within which the plastic section is immersed as it passes therethrough.

6. The apparatus as defined in claim 1 wherein said inlet and outlet sizing gauge portion bodies are each defined by at least two gauge body parts divided along a longitudinal plane along the path of travel of the plastic section through said cavities, and said inlet and outlet sizing gauge securing means includes a flange carried by each gauge body secured to its associated side wall.

7. The apparatus as defined in claim 6 wherein said tank includes an upper portion closed by a lid.

8. The apparatus as defined in claim 6 wherein said tank includes a front wall provided with an inspection window.

9. The apparatus as defined in claim 6 including means in said tank at a level appreciably above a path defined by the extruded plastic section as it passes through said tank for effecting an overflow of the cooling fluid such as to create a water bath in the tank within which the plastic section is immersed as it passes therethrough.

* * * * *